United States Patent
Huang et al.

(10) Patent No.: US 11,640,215 B1
(45) Date of Patent: May 2, 2023

(54) TOUCHPAD MODULE THAT CAN BE TRIGGERED BY PRESSING DOWN IN ALL REGIONS AND COMPUTING DEVICE USING THE TOUCHPAD MODULE

(71) Applicant: Primax Electronics Ltd., Taipei (TW)

(72) Inventors: Wei-Chiang Huang, Taipei (TW); Chao-Wei Lee, Taipei (TW); Hsueh-Chao Chang, Taipei (TW); Sian-Yi Chiu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/856,802

(22) Filed: Jul. 1, 2022

(30) Foreign Application Priority Data

Jun. 14, 2022 (TW) .................................. 111122091

(51) Int. Cl.
*G06F 3/041* (2006.01)
*G06F 1/16* (2006.01)

(52) U.S. Cl.
CPC ............ *G06F 3/0414* (2013.01); *G06F 1/169* (2013.01); *G06F 2203/04104* (2013.01); *G06F 2203/04105* (2013.01)

(58) Field of Classification Search
CPC .................. G06F 3/0414; G06F 1/169; G06F 2203/04104; G06F 2203/04105
See application file for complete search history.

(56) References Cited

U.S. PATENT DOCUMENTS

| | | | |
|---|---|---|---|
| 2007/0070044 A1* | 3/2007 | Yeh ....................... | G06F 3/0202 345/169 |
| 2019/0258290 A1* | 8/2019 | Song ..................... | G06F 1/1692 |

* cited by examiner

*Primary Examiner* — Afroza Chowdhury
(74) *Attorney, Agent, or Firm* — Kirton McConkie; Evan R. Witt

(57) ABSTRACT

A touchpad module includes a touch member, a base plate, a supporting element and a switch. The touch member includes a first touch region and a second touch region. The base plate is located under the touch member. The supporting element is arranged between the touch member and the base plate. The supporting element is aligned with the second touch region. The switch is arranged between the touch member and the base plate. The switch is aligned with the second touch region. When a pressing force is applied to the second touch region of the touch member, the pressing force is transmitted to the base plate through the supporting element. Consequently, the base plate is subjected to deformation. The switch is triggered in response to the deformation of the base plate.

7 Claims, 6 Drawing Sheets

TOUCHPAD MODULE THAT CAN BE TRIGGERED BY PRESSING DOWN IN ALL REGIONS AND COMPUTING DEVICE USING THE TOUCHPAD MODULE

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

FIG. 1 schematically illustrates a conventional notebook computer with a touchpad module. As shown in FIG. 1, the touchpad module 1 is installed on a casing 21 of the notebook computer 2. Moreover, at least a portion of the touchpad module 1 is exposed outside so as to be touched by the user's finger. Consequently, the user may operate the touchpad module 1 to control the notebook computer 2. For example, in case that the user's finger is placed on the touchpad module 1 and slid on the touchpad module 1, a cursor 23 shown on a display screen 22 of the notebook computer 2 is correspondingly moved. Moreover, in case that the touchpad module 1 is pressed down by the user's finger, the notebook computer 2 executes a specified function. The use of the touchpad module 1 can implement some functions of the conventional mouse. In other words, the user may operate the notebook computer 2 through the touchpad module 1 without the need of additionally carrying or installing the mouse.

FIG. 2 is a schematic cross-sectional view illustrating the touchpad module as shown in FIG. 1, in which the touchpad module is not pressed down. FIG. 3 is a schematic cross-sectional view illustrating the touchpad module as shown in FIG. 2, in which the touchpad module is pressed down. As shown in FIGS. 2 and 3, a fixing frame 24 is concavely formed in the casing 21 of the notebook computer 2. The touchpad module 1 is installed within the fixing frame 24. The touchpad module 1 comprises a supporting structure 11, a triggering part 12 and a touch member 13. The supporting structure 11 and triggering part 12 are located at two opposite sides of the fixing frame 24. The touch member 13 of the touchpad module 1 is connected with the supporting structure 11. Consequently, the touch member 13 of the touchpad module 1 can be swung relative to the triggering part 12 by using the supporting structure 11 as a fulcrum. The touchpad module 1 further comprises a switch 14. The switch 14 is located under the touch member 13 and aligned with the triggering part 12.

While the touch member 13 is pressed down by the user, the touch member 13 is swung downwardly relative to the triggering part 12 by using the supporting structure 11 as a fulcrum. When the switch 14 of the touchpad module 1 is pushed by the triggering part 12 of the fixing frame 24, the switch 14 is triggered to generate a switch signal to the notebook computer 2. According to the switch signal, the notebook computer 2 executes a corresponding function. When the touch member 13 is no longer pressed by the user, the touch member 13 is swung upwardly relative to the triggering part 12 in response to the elastic force of the supporting structure 11. Consequently, the touch member 13 is returned to its original position.

However, the conventional touchpad module 1 still has some drawbacks. As shown in FIG. 1, the touch member 13 has a first region A and a second region B. The supporting structure 11 is located under the first region A of the touch member 13. When the first region A of the touch member 13 is touched by the user, the first region A of the touch member 13 cannot be pressed down successfully. Since the supporting structure 11 is not located under the second region B of the touch member 13, only the second region B of the touch member 13 can be pressed down. That is, when the second region B of the touch member 13 can be pressed down, the touch member 13 can be swung relative to the triggering part 12.

As mentioned above, the touch member 13 of the conventional touchpad module 1 can be locally pressed down to trigger the switch 14. In other words, it is unable to press down the whole region of the touch member 13 to trigger the switch 14.

Therefore, there is a need of providing an improved touchpad module in order to overcome the above drawbacks.

SUMMARY OF THE INVENTION

An object of the present invention provides a touchpad module. Due to the special design, the whole region of a touch member of the touchpad module can be pressed down.

Another object of the present invention provides a computing device with a touchpad module. The whole region of a touch member of the touchpad module can be pressed down.

The other objects and advantages of the present invention will be understood from the disclosed technical features.

In accordance with an aspect of the present invention, a touchpad module for a computing device is provided. The touchpad module being installed within a fixing frame of the computing device. The touchpad module includes a touch member, a base plate, a supporting element and a switch. The touch member includes a first touch region and a second touch region. The base plate is located under the touch member. The supporting element is arranged between the touch member and the base plate. The supporting element is aligned with the second touch region. The switch is arranged between the touch member and the base plate. The switch is aligned with the second touch region. When a pressing force is applied to the second touch region of the touch member, the pressing force is transmitted to the base plate through the supporting element. Consequently, the base plate is subjected to deformation. The switch is triggered in response to the deformation of the base plate.

In an embodiment, the touch member includes a circuit board and a covering plate. The covering plate is located over the circuit board.

In an embodiment, the touchpad module further includes a flexible printed circuit board. The flexible printed circuit board is arranged between the base plate and the supporting element. The switch is installed on the flexible printed circuit board.

In an embodiment, the switch is a haptics sensor.

In accordance with another aspect of the present invention, a touchpad module for a computing device is provided. The touchpad module being installed within a fixing frame of the computing device. The touchpad module includes a touch member, a base plate, a supporting element and a switch. The touch member includes a first touch region and a second touch region. The base plate is located under the touch member. The base plate includes a perforation. The supporting element is arranged between the touch member and the base plate. The supporting element is aligned with the second touch region. The switch is disposed within the perforation of the base plate. The switch is aligned with the second touch region. When a pressing force is applied to the second touch region of the touch member, the pressing force is transmitted to the base plate through the supporting element. Consequently, the base plate is subjected to deformation. The switch is triggered in response to the deformation of the base plate.

In accordance with another aspect of the present invention, a computing device is provided. The computing device includes a casing, a processor and a touchpad module. A fixing frame is concavely formed in the casing. The processor is disposed within the casing. The touchpad module is disposed within the fixing frame and electrically connected with the processor. The touchpad module includes a touch member, a base plate, a supporting element and a switch. The touch member includes a first touch region and a second touch region. The base plate is located under the touch member. The supporting element is arranged between the touch member and the base plate. The supporting element is aligned with the second touch region. The switch is arranged between the touch member and the base plate. The switch is aligned with the second touch region. When a pressing force is applied to the second touch region of the touch member, the pressing force is transmitted to the base plate through the supporting element. Consequently, the base plate is subjected to deformation. The switch is triggered in response to the deformation of the base plate.

In accordance with another aspect of the present invention, a computing device is provided. The computing device includes a casing, a processor and a touchpad module. A fixing frame is concavely formed in the casing. The processor is disposed within the casing. The touchpad module is disposed within the fixing frame and electrically connected with the processor. The touchpad module includes a touch member, a base plate, a supporting element and a switch. The touch member includes a first touch region and a second touch region. The base plate is located under the touch member. The base plate includes a perforation. The supporting element is arranged between the touch member and the base plate. The supporting element is aligned with the second touch region. The switch is disposed within the perforation of the base plate. The switch is aligned with the second touch region. When a pressing force is applied to the second touch region of the touch member, the pressing force is transmitted to the base plate through the supporting element. Consequently, the base plate is subjected to deformation. The switch is triggered in response to the deformation of the base plate.

From the above descriptions, the present invention provides the touchpad module and the computing device using the touchpad module. The switch is located under the second touch region of the touch member that is unable to be pressed down. When the second touch region of the touch member is pressed, the base plate is subjected to deformation. After the base plate is subjected to deformation, the switch under the second touch region of the touch member is triggered in response to the deformation amount of the base plate. Consequently, the purpose of triggering the switch by pressing the whole region of the touch member of the touchpad module can be achieved.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
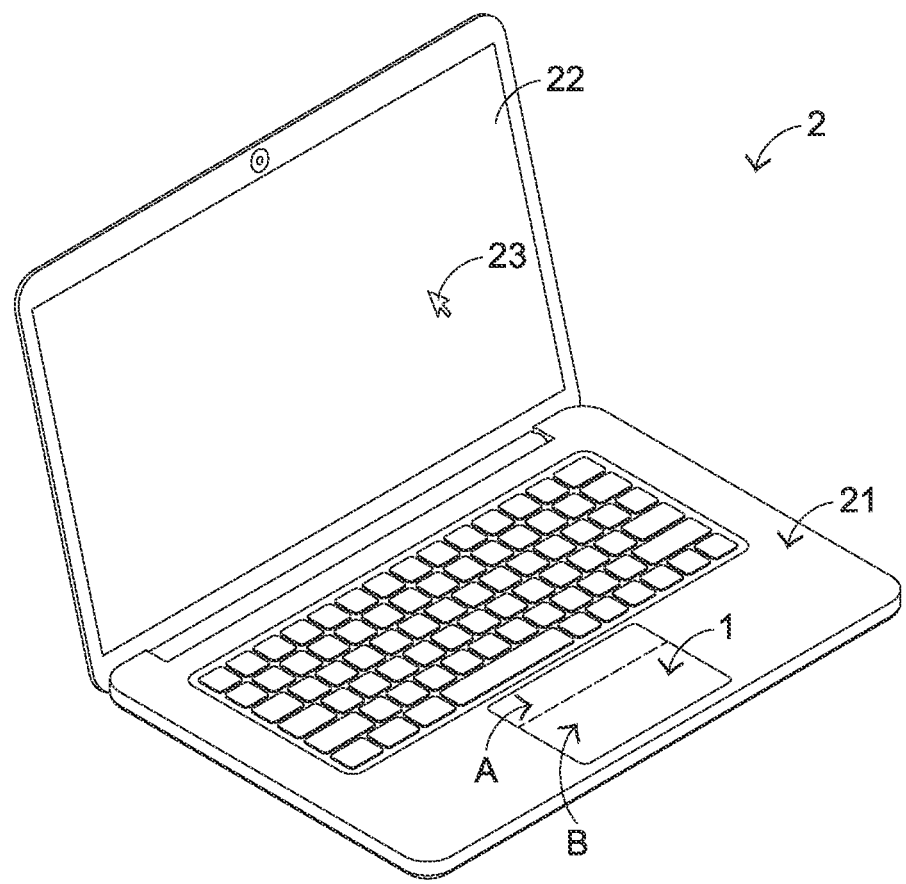
FIG. 1 schematically illustrates a conventional notebook computer with a touchpad module.
Figure 2:
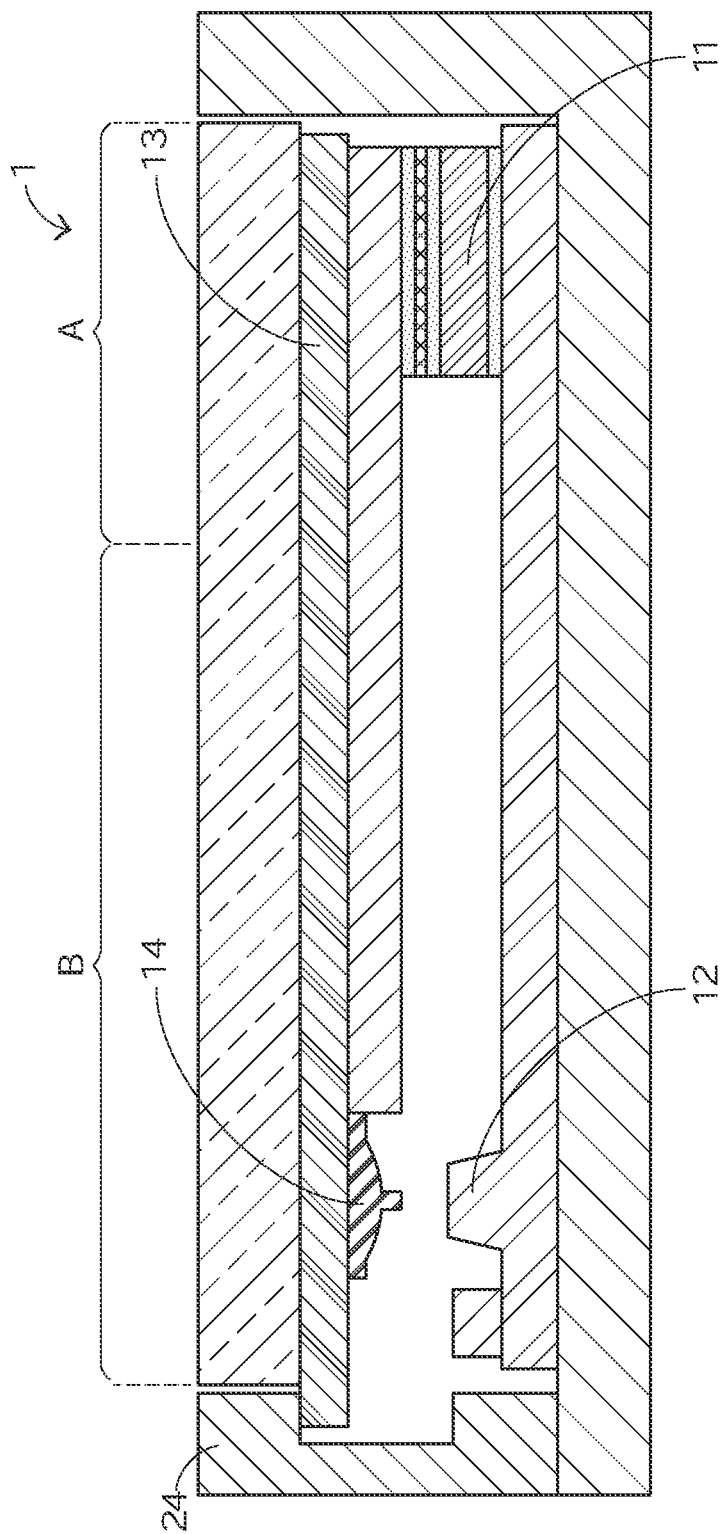
FIG. 2 is a schematic cross-sectional view illustrating the touchpad module as shown in FIG. 1, in which the touchpad module is not pressed down.
Figure 3:
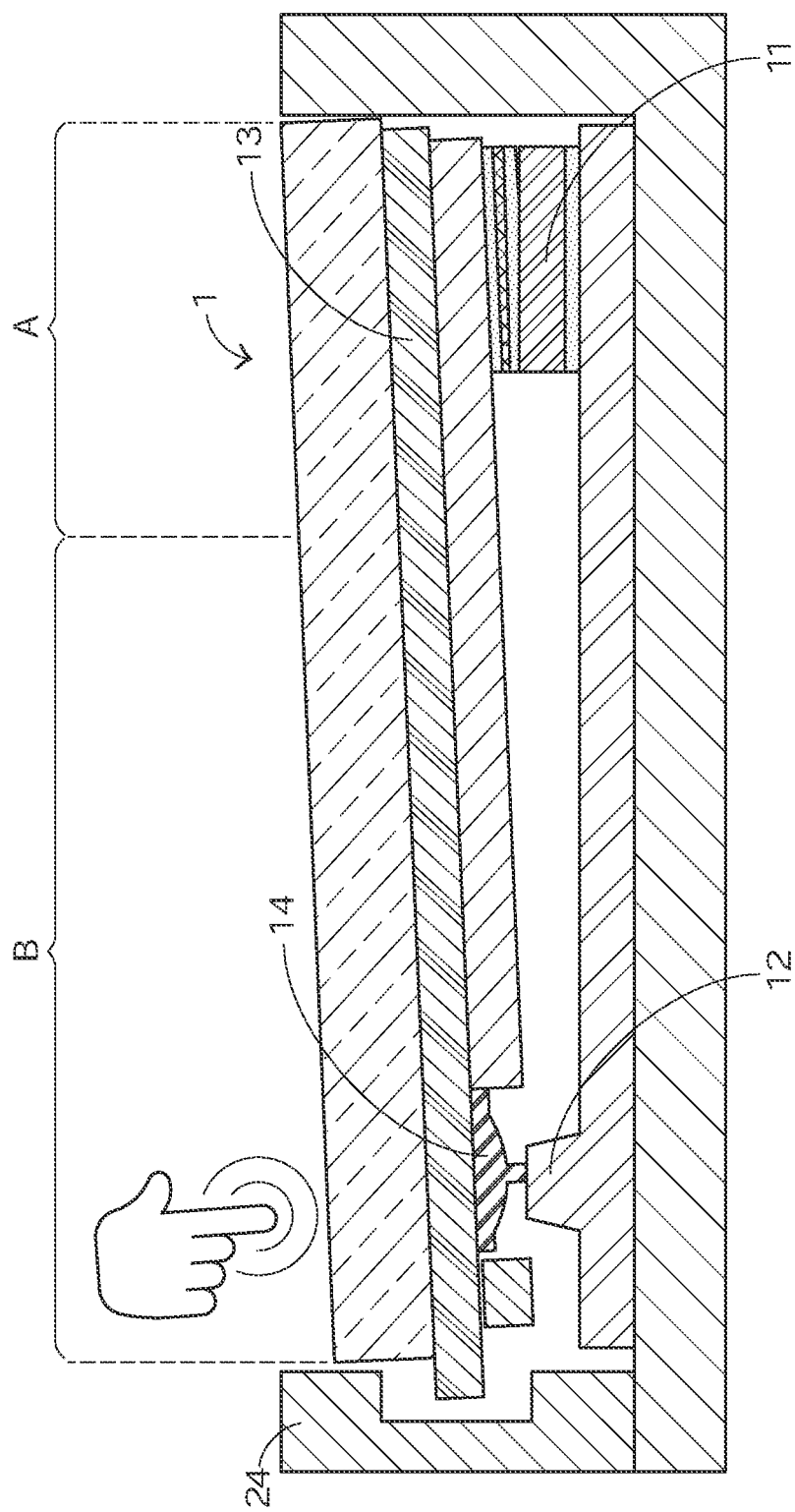
FIG. 3 is a schematic cross-sectional view illustrating the touchpad module as shown in FIG. 2, in which the touchpad module is pressed down.
Figure 4:
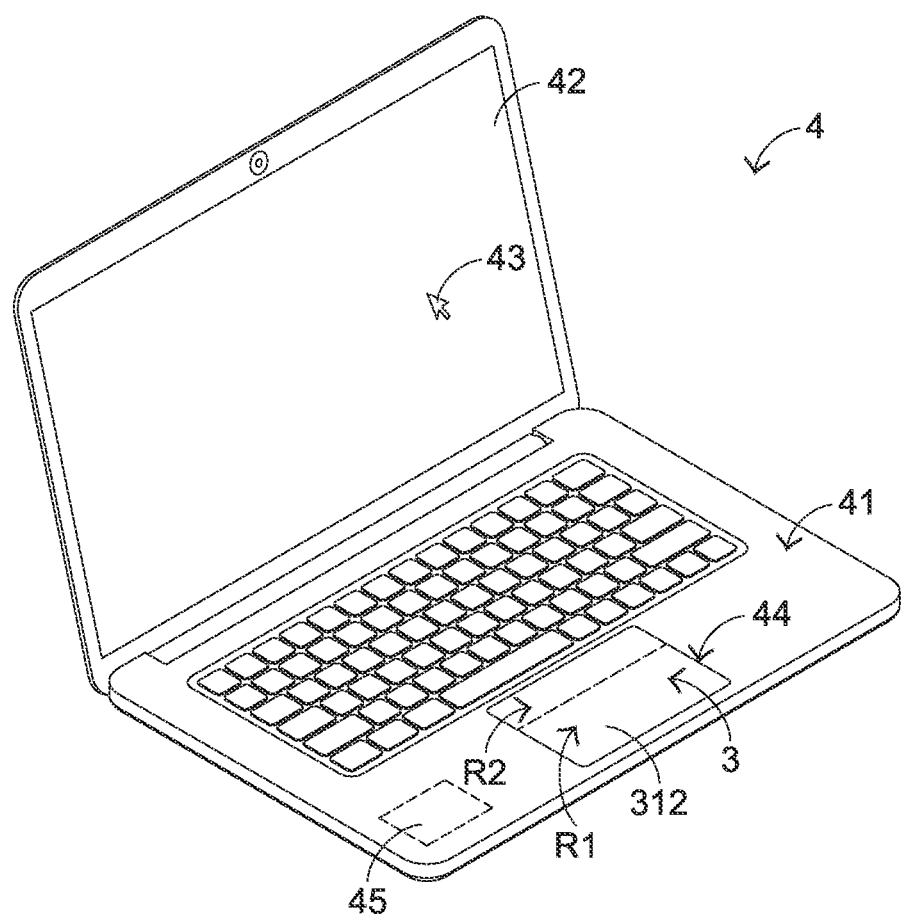
FIG. 4 is a schematic perspective view illustrating the outer appearance of a computing device with a touchpad module according to an embodiment of the present invention.

FIG. 4 is a schematic perspective view illustrating the outer appearance of a computing device with a touchpad module according to an embodiment of the present invention. An example of the computing device 4 includes but is not limited to a notebook computer. In an embodiment, the computing device 4 comprises a casing 41, a display screen 42, a processor 45 and a touchpad module 3. The processor 45 is disposed within the casing 41. The processor 41 is used for processing electronic signals of the computing device 4. Moreover, a fixing frame 44 is concavely formed in the casing 41. The touchpad module 3 is disposed within the fixing frame 44 and electrically connected with the processor 45. In addition, at least a portion of the touchpad module 3 is exposed outside so as to be touched by the user's finger. Consequently, the user can operate the touchpad module 3 to control the computing device 4. For example, in case that the user's finger is placed on the touchpad module 3 and slid on the touchpad module 3, a cursor 43 shown on the display screen 42 is correspondingly moved. Moreover, in case that the touchpad module 3 is pressed down by the user's finger, the computing device 4 executes a specified function.

The other structure of the touchpad module 3 will be described in more details as follows.

Figure 5:
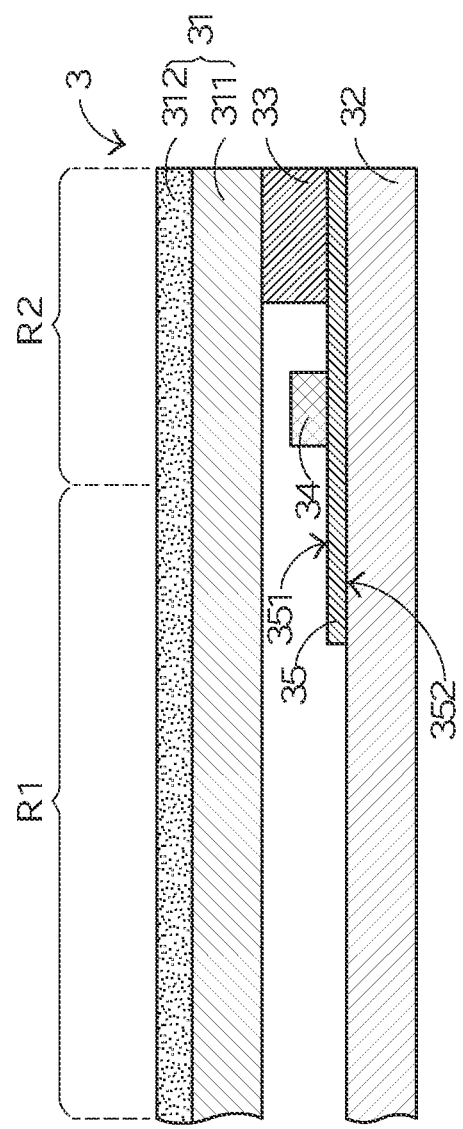
FIG. 5 is a schematic cross-sectional view illustrating a portion of the touchpad module as shown in FIG. 4.

Please refer to FIG. 5. FIG. 5 is a schematic cross-sectional view illustrating a portion of the touchpad module as shown in FIG. 4. As shown in FIGS. 4 and 5, the touchpad module 3 comprises a touch member 31, a base plate 32, a supporting element 33 and a switch 34.

The touch member 31 comprises a first touch region R1 and a second touch region R2. The base plate 32 is located under the touch member 31. The supporting element 33 is arranged between the touch member 31 and the base plate 32. Moreover, the supporting element 33 is located at an end of the touchpad module 3. That is, the supporting element 33 is located at a position aligned with the second touch region R2 of the touch member 31. The switch 34 is arranged between the touch member 31 and the base plate 32. Moreover, the switch 34 is located beside the supporting element 33. That is, the switch 34 is located at a position aligned with the second touch region R2 of the touch member 31. When the second touch region R2 of the touch member 31 is pressed, the base plate 32 is subjected to deformation in response to the pressing force from the touch member 31. In response to the deformation of the base plate 32, the switch 34 is triggered.

In this embodiment, the area of the first touch region R1 of the touch member 31 is larger than the area of the second touch region R2 of the touch member 31. For example, the area of the first touch region R1 occupies two thirds of the area of the top surface of the touch member 31, and the area of the second touch member R2 occupies one third of the area of the top surface of the touch member 31.

When the second touch region R2 of the touch member 31 is pressed, the touch member 31 is not moved relative to the base plate 32. However, after the second touch region R2 of the touch member 31 is pressed, the pressing force applied to the touch member 31 is transmitted to the base plate 32 through the supporting element 33. Consequently, the base plate 32 is subjected to the deformation. Meanwhile, the switch 34 located beside the supporting element 33 and aligned with the second touch region R2 is triggered in response to the deformation amount of the base plate 32.

Preferably but not exclusively, the switch 34 is a haptics sensor. When the second touch region R2 of the touch member 31 is pressed and the switch 34 is triggered, the switch 34 issues a switch signal to the processor 45 of the computing device 4. After the processor 45 receives the switch signal from the switch 34, the processor 45 issues a feedbacks signal to the switch 34. Consequently, the switch 34 is driven to generate a haptics feedback effect.

Especially, the switch 34 used in the touchpad module 3 not only has the function of generating the haptics feedback effect bus also has a pressure sensing function. Due to the pressure sensing function, the pressure applied to the second touch region R2 of the touch member 31 can be sensed by the switch 34. Moreover, according to the sensed pressure, the switch 34 issues a corresponding switch signal to the processor 45 of the computing device 4. Consequently, the computing device 4 executes a corresponding specified function.

Please refer to FIGS. 4 and 5 again. In an embodiment, the touch member 31 comprises a circuit board 311 and a covering plate 312. The touchpad module 3 is electrically connected with the processor 45 of the computing device 4 through the circuit board 311 of the touch member 31. The covering plate 312 is located over the circuit board 311. Moreover, the covering plate 312 and the circuit board 311 are combined together through an adhesive layer (not shown). Preferably but not exclusively, the adhesive layer is made of a pressure sensitive adhesive (PSA) or any other appropriate material. Preferably but not exclusively, the covering plate 312 is made of Mylar or any other appropriate material. The material of the covering plate 312 may be varied according to the practical requirements. Preferably but not exclusively, the base plate 32 is made of a metallic material or any other appropriate material.

Please refer to FIGS. 4 and 5 again. In an embodiment, the touchpad module 3 further comprises a flexible printed circuit board 35. The flexible printed circuit board 35 is arranged between the base plate 32 and the supporting element 33. The switch 34 is installed on a first surface 351 of the flexible printed circuit board 35. The switch 34 is electrically connected with the circuit board 311 of the touch member 31 through the flexible printed circuit board 35. After the switch 34 is triggered and the switch signal is generated, the switch signal is transmitted to the processor 45 of the computing device 4 through the flexible printed circuit board 35 and the circuit board 311. Moreover, the feedback signal from the processor 45 is transmitted to the switch 34 through the circuit board 311 and the flexible printed circuit board 35.

As mentioned above, the switch 34 is installed on the first surface 351 of the flexible printed circuit board 35 and arranged between the base plate 32 and the touch member 31. Consequently, the deformation amount of the base plate 32 is large. If the base plate 32 is bent downwardly to a large extent in response to the pressing force, the pressure applied to the switch 34 during the deformation of the base plate 32 is large and thus the switch 34 is possibly damaged. For overcoming the above drawbacks, the structure of the touchpad module 1 needs to be modified. Hereinafter, the structure of another touchpad module 1 will be described.

Figure 6:
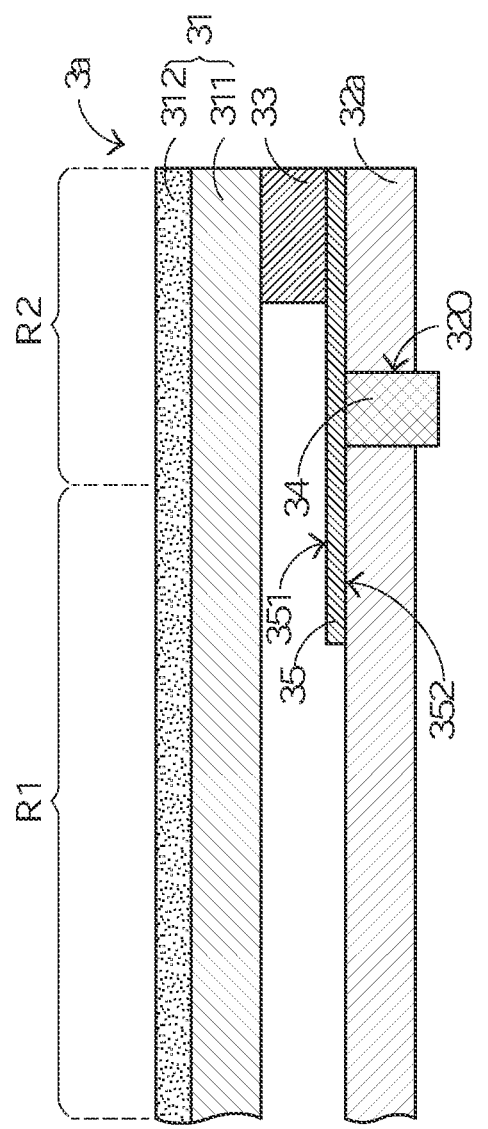
FIG. 6 is a schematic cross-sectional view illustrating a portion of the touchpad module according to another embodiment of the present invention.

FIG. 6 is a schematic cross-sectional view illustrating a portion of the touchpad module according to another embodiment of the present invention. The structure of the touchpad 3a as shown in FIG. 6 is similar to the that of the touchpad module 3 as shown in FIGS. 4 and 5. In comparation with the touchpad module 3 as shown in FIGS. 4 and 5, the base plate 32a in the touchpad module 3a of this embodiment comprises a perforation 320. The switch 34 is installed on a second surface 352 of the flexible printed circuit board 35 and disposed within the perforation 320 of the base plate 32a. The touchpad module 3a has the following structural design. Similarly, after the base plate 32a is subjected to deformation, the switch 34 is triggered in response to the deformation amount of the base plate 32a. Especially, the switch 34 is disposed within the perforation 320 of the base plate 32a. Even if the deformation amount of the base plate 32a is large, the pressure applied to the switch 34 during the deformation of the base plate 32a is effectively reduced. Consequently, the switch 34 is not damaged during the deformation of the base plate 32a.

From the above descriptions, the present invention provides the touchpad module and the computing device using the touchpad module. The switch is located under the second touch region of the touch member that is unable to be pressed down. When the second touch region of the touch member is pressed, the base plate is subjected to deformation. After the base plate is subjected to deformation, the switch under the second touch region of the touch member is triggered in response to the deformation amount of the base plate. Consequently, the purpose of triggering the switch by pressing the whole region of the touch member of the touchpad module can be achieved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the touchpad module being installed within a fixing frame of the computing device, the touchpad module comprising:

a touch member comprising a first touch region and a second touch region;

a base plate located under the touch member;

a supporting element arranged between the touch member and the base plate, wherein the supporting element is aligned with the second touch region; and a switch arranged between the touch member and the base plate, wherein the switch is aligned with the second touch region, wherein when a pressing force is applied to the second touch region of the touch member, the pressing force is transmitted to the base plate through the supporting element, so that the base plate is subjected to deformation, wherein the switch is triggered in response to the deformation of the base plate.

2. The touchpad module according to claim 1, wherein the touch member comprises a circuit board and a covering plate, wherein the covering plate is located over the circuit board.

3. The touchpad module according to claim 1, wherein the touchpad module further comprises a flexible printed circuit board, wherein the flexible printed circuit board is arranged between the base plate and the supporting element, and the switch is installed on the flexible printed circuit board.

4. The touchpad module according to claim 1, wherein the switch is a haptics sensor.

5. A touchpad module for a computing device, the touchpad module being installed within a fixing frame of the computing device, the touchpad module comprising:

a touch member comprising a first touch region and a second touch region;

a base plate located under the touch member, wherein the base plate comprises a perforation;

a supporting element arranged between the touch member and the base plate, wherein the supporting element is aligned with the second touch region; and a switch disposed within the perforation of the base plate, wherein the switch is aligned with the second touch region, wherein when a pressing force is applied to the second touch region of the touch member, the pressing force is transmitted to the base plate through the supporting element, so that the base plate is subjected to deformation, wherein the switch is triggered in response to the deformation of the base plate.

6. A computing device, comprising:

a casing, wherein a fixing frame is concavely formed in the casing;

a processor disposed within the casing; and a touchpad module disposed within the fixing frame and electrically connected with the processor, wherein the touchpad module comprises:

a touch member comprising a first touch region and a second touch region;

a base plate located under the touch member;

a supporting element arranged between the touch member and the base plate, wherein the supporting element is aligned with the second touch region; and a switch arranged between the touch member and the base plate, wherein the switch is aligned with the second touch region, wherein when a pressing force is applied to the second touch region of the touch member, the pressing force is transmitted to the base plate through the supporting element, so that the base plate is subjected to deformation, wherein the switch is triggered in response to the deformation of the base plate.

7. A computing device, comprising:

a casing, wherein a fixing frame is concavely formed in the casing;

a processor disposed within the casing; and a touchpad module disposed within the fixing frame and electrically connected with the processor, wherein the touchpad module comprises:

a touch member comprising a first touch region and a second touch region;

a base plate located under the touch member, wherein the base plate comprises a perforation;

a supporting element arranged between the touch member and the base plate, wherein the supporting element is aligned with the second touch region; and a switch disposed within the perforation of the base plate, wherein the switch is aligned with the second touch region, wherein when a pressing force is applied to the second touch region of the touch member, the pressing force is transmitted to the base plate through the supporting element, so that the base plate is subjected to deformation, wherein the switch is triggered in response to the deformation of the base plate.

* * * * *